United States Patent [19]

Koitabash

[11] Patent Number: 4,705,973

[45] Date of Patent: Nov. 10, 1987

[54] ELECTROMAGNETIC CLUTCH WITH SPIRAL PLATED SURFACES TO IMPROVE FRICTIONAL CONTACT

[75] Inventor: Takatoshi Koitabashi, Annaka, Japan

[73] Assignee: Sanden Corporation, Gunma, Japan

[21] Appl. No.: 899,901

[22] Filed: Aug. 25, 1986

[30] Foreign Application Priority Data

Aug. 23, 1985 [JP] Japan .................. 60-184063

[51] Int. Cl.$^4$ ............................................. H02K 7/108
[52] U.S. Cl. .................................... 310/78; 192/70.14; 192/107 M
[58] Field of Search .......... 192/70.14, 107 R, 107 M; 310/78, 76, 100

[56] References Cited

U.S. PATENT DOCUMENTS

| | | | |
|---|---|---|---|
| 2,136,370 | 11/1938 | Bockius et al. | 192/107 M |
| 2,533,480 | 12/1950 | Leininger et al. | 192/107 R |
| 2,922,221 | 1/1960 | Morton et al. | 192/107 M |
| 4,311,524 | 1/1982 | Genkin et al. | 192/107 M |
| 4,449,622 | 5/1984 | Okano et al. | 310/78 |

Primary Examiner—Patrick R. Salce
Assistant Examiner—D. L. Rebsch
Attorney, Agent, or Firm—Banner, Birch, McKie & Beckett

[57] ABSTRACT

An electromagnetic clutch comprising a rotor and an armature plate with improved frictional surfaces. The armature plate is disposed to face the rotor with a predetermined axial gap. The rotor and the armature plate are provided with contact surfaces, each of which contains spiral concaves and projections with a predetermined pitch. At least one of the surfaces of the rotor or armature plate has a layer of metal plating with a hardness lower than that of the magnetic materials which make up the rotor and armature plate.

4 Claims, 9 Drawing Figures

PITCH

ELECTROMAGNETIC CLUTCH WITH SPIRAL PLATED SURFACES TO IMPROVE FRICTIONAL CONTACT

TECHNICAL FIELD

This invention relates to an electromagnetic clutch, and more particularly, to an improved construction of the frictional surface of an armature plate and a rotor contained within an electromagnetic clutch.

BACKGROUND OF THE INVENTION

Electromagnetic clutches are well known in the prior art and are often used for controlling the transfer of power from an automobile engine to the refrigerant compressor of an automobile air conditioning system.

With reference to FIG. 1, a standard electromagnetic clutch will be described. FIG. 1 is a cross-sectional view showing an electromagnetic clutch mounted on a refrigerant compressor. The electromagnetic clutch has ring-shaped rotor 2 rotatably supported on tubular projecting portion 3a of compressor housing 3 through radial bearing 4. A fan belt (not shown) will impart a rotational force to rotor 2 when the automobile engine is running. An electromagnet 5 is disposed in hollow portion 6 which is formed in rotor 2 and fixed on the compressor housing 3 by means of bolts. Electromagnet 5 comprises annular U-shaped housing 5a and electromagnetic coil 5b contained within housing 5a.

Drive shaft 7 is rotatably supported in compressor housing 3 through a radial bearing (not shown) which is mounted in tubular projecting portion 3a. Hub 8 is secured on the outer end of drive shaft 7 which extends from tubular projecting portion 3a and is connected to ring-shaped armature plate 10 through a plurality of leaf springs 9. Armature plate 10 is thus supported by leaf springs 9 around hub 8 and frictional surface 10a faces frictional surface 2a of rotor 2. An axial gap is formed between armature plate 10 and surface 2a and a radial gap between armature plate 10 and hub 8.

When coil 5b of electromagnet 5 is energized, magnetic flux is generated and passes through annular housing 5a, rotor 2, and armature plate 10. Armature plate 10 is attracted to surface 2a of rotor 2. Accordingly, the rotational force supplied by the fan belt to rotor 2 is transmitted to drive shaft 7 through armature plate 10. When coil 5b of electromagnet 5 is deenergized, the magnetic flux dissipates and frictional surface 10a of armature plate 10 disengages from surface 2a of rotor 2 by the recoil strength of leaf springs 9, and the rotational force of rotor 2 is no longer transmitted to drive shaft 7.

In the above-described electromagnetic clutch, the frictional surface 2a of rotor 2 and the frictional surface 10a of armature plate 10 have irregular concaves and projections. A magnified view of such a surface is shown in FIG. 2. When two such surfaces initially make contact as described above, the actual contact area is less than 20 percent of the entire surface.

Referring to FIG. 3, when the frictional surfaces of rotor 2 and armature plate 10 are initially engaged with one another, wedge-shaped projections 2b of rotor 2 and wedge-shaped projections 10b of armature plate 10 meet and a large frictional force is produced therebetween. This force generates shears on the top of the projections. Accordingly, after projections 10b and 2b are engaged with each other two or three times, the tops of the projections are shaved off, and the torque transferred to drive shaft 7 is decreased.

The contact area between the rotor and the armature plate will gradually increase due to the abrasion caused by continuous engagement; thus the torque transfer of electromagnetic clutch 1 will eventually increase and become three or four times the required value. However, before the clutch has been engaged a certain number of times, e.g., 50 times, the torque transfer of the electromagnetic clutch has not increased to the desired level.

To obtain a larger torque transfer when the clutch is initially operated, the area of contact between the two frictional surfaces can be enlarged, or the magnetic force can be increased by enlarging the sectional area of coil 5b. However, these methods of obtaining a larger torque transfer cause an increase in the size of the electromagnetic clutch and an increase in its weight.

Since the frictional surfaces have approximately the same hardness, the contact between the surfaces in the initial stages of operation will produce a weld deposit of high hardness between the surfaces, and the frictional surfaces will become rough.

SUMMARY OF THE INVENTION

It is a primary object of this invention to provide an electromagnetic clutch which will transfer a high percentage of the input torque.

It is another object of this invention to provide an electromagnetic clutch which is compact and light weight.

An electromagnetic clutch according to this invention includes a first rotatable member having an axial end plate of magnetic material and a second rotatable member. The second rotatable member includes a rotatable shaft, a hub mounted on the end of the shaft and a radially extending flange portion mounted on the hub which faces the axial end plate of the first rotatable member at a predetermined axial gap. An annular armature plate is disposed in the axial gap between the first rotatable member and the flange portion mounted on the hub. The armature plate faces the axial end plate of the first rotatable member with an axial air gap therebetween. An electromagnetic means is disposed within the first rotatable member for attracting the armature plate to the axial end plate of the first rotatable member. The axial end surface of the first rotatable member and the armature plate are provided with spiral curved concaves and projections with a predetermined pitch, and at least one of the axial end surfaces of the first rotatable member and armature plate has a layer of metal plating with a lower hardness than the magnetic materials of the rotor and armature plate.

Further objects, features and other aspects of this invention will be understood from the following detailed description of the preferred embodiment while referring to the annexed drawings.

DETAILED DESCRIPTION OF THE INVENTION

Figure 1:
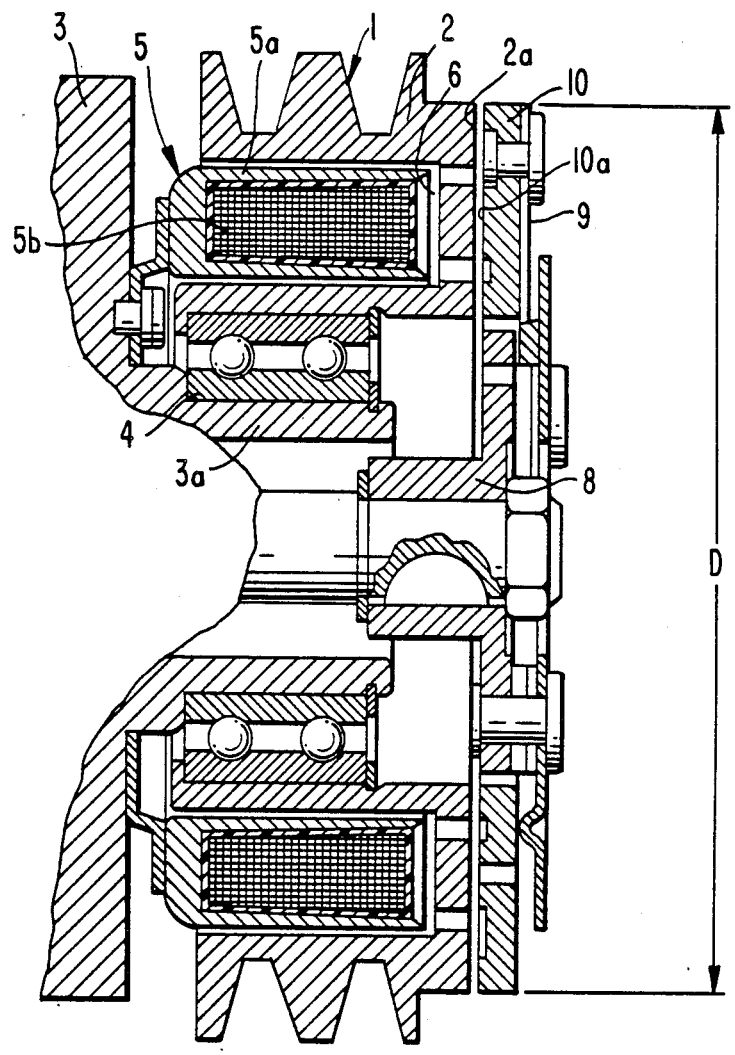
FIG. 1 is a vertical cross-sectional view of an electromagnetic clutch known in the prior art.
Figure 2:
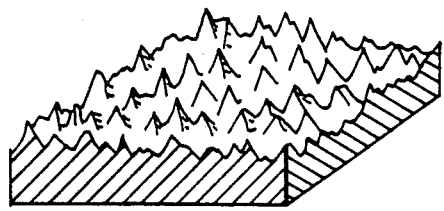
FIG. 2 is a magnified view illustrating a frictional surface of an armature plate or a rotor of the electromagnetic clutch of FIG. 1.
Figure 3:
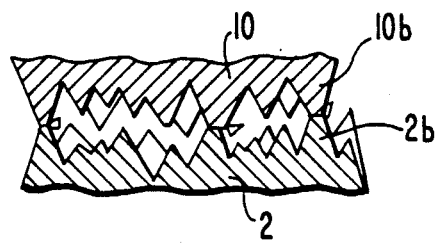
FIG. 3 is a cross-sectional view illustrating the frictional surfaces of an armature plate and a rotor when those surfaces initially interact.
Figure 4:
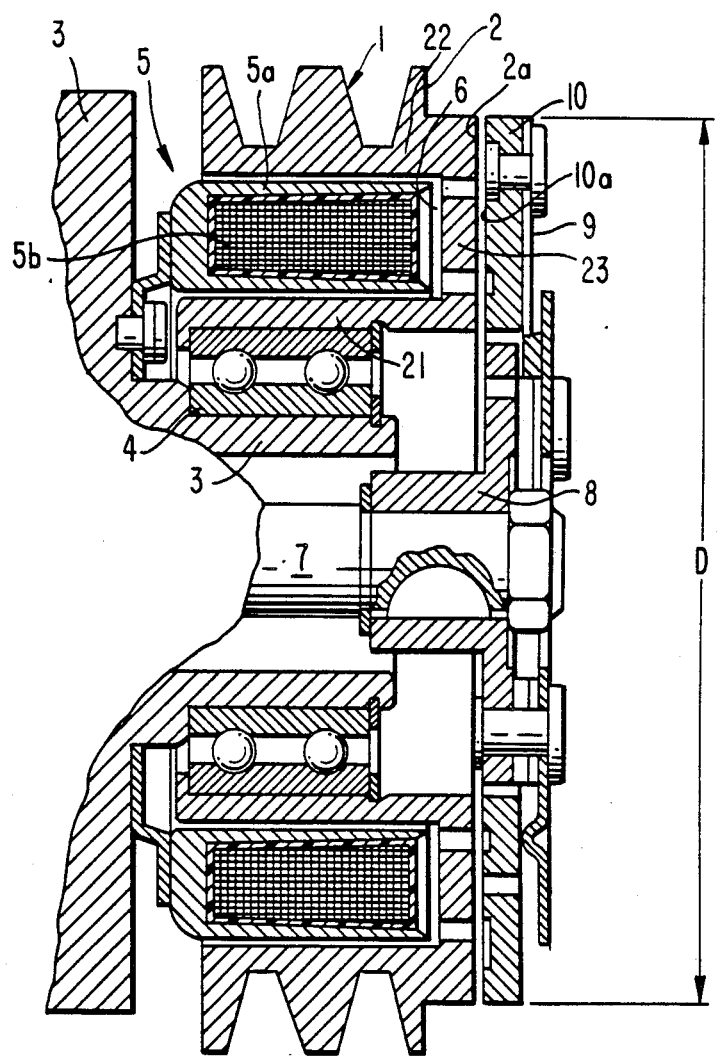
FIG. 4 is a cross-sectional view of an electromagnetic clutch in accordance with one embodiment of the present invention.
Figure 5:
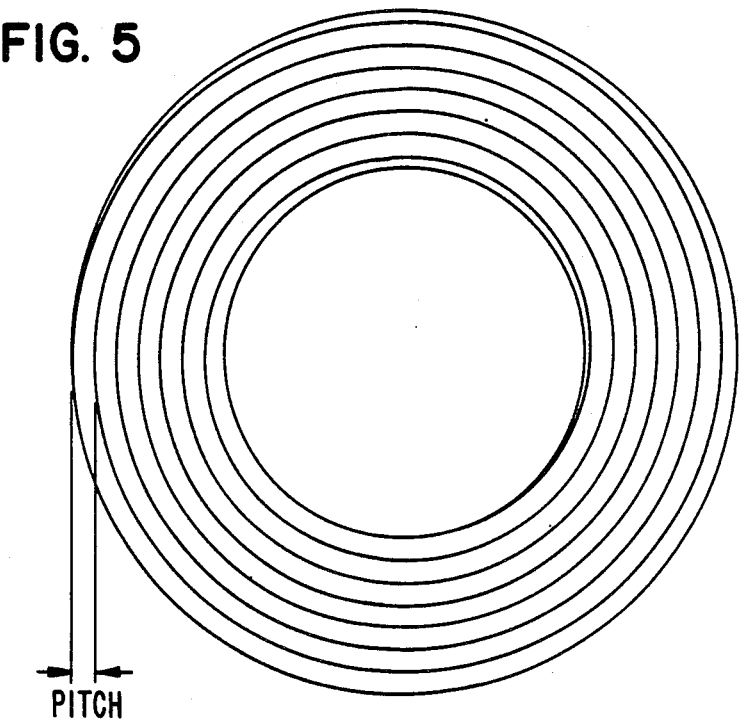
FIG. 5 is a front view of a frictional surface of an armature plate or rotor of the electromagnetic clutch of FIG. 4.

FIGS. 4 and 5 depict an electromagnetic clutch according to the present invention. The clutch is similar to the electromagnetic clutch shown in FIG. 1 except for the construction of the rotor and armature plate. Therefore, similar parts are represented by the same reference numbers and a detailed description of these parts is omitted.

Figure 6:
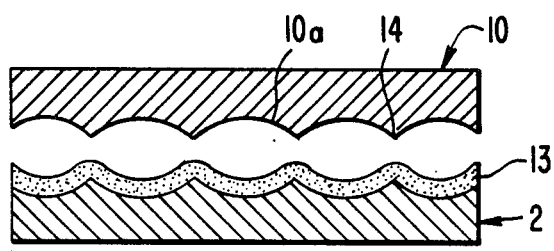
FIG. 6 is an enlarged cross-sectional view illustrating the frictional surfaces of an armature plate and a rotor of the electromagnetic clutch of FIG. 4.

In this embodiment rotor 2 is formed of an integrated body of magnetic material, such as steel, and comprises inner cylindrical portion 21, outer cylindrical portion 22 and end plate 23 which is connected at its axial end between cylindrical portions 21 and 22. End plate 23 is provided with a plurality of concentrically acuated grooves as shown in FIG. 5. These grooves yield a frictional surface with alternating concave portions and acuate projections, shown more clearly in FIGS. 6–8. Frictional surface 2a of rotor 2 is finished by machining and is then plated by disposing the rotor in a plating tank to form a layer of plating 13. Thus, layer 13 is formed on surface 2a, as shown in FIG. 6. Layer 13 may be treated on the surface by electric zinc galvanizing, and has a Brinell hardness of 45. Armature plate 10 is also formed of magnetic material, such as a steel plate, and has a Brinell hardness of 62. The spiral concaves and projections are also formed on frictional surface 10a of armature plate 10.

The spiral concaves and projections formed on rotor 2 and armature plate 10 have certain intervals or pitch, e.g., from 0.3 mm to 0.5 mm and can extend in the same spiral direction as each other or in opposite spiral directions. The spiral direction can also be the same as, or opposite to, the direction of rotation. These concaves and projections are easily formed by machining. When magnetic coil 5b is energized, armature plate 10 which is connected with drive shaft 7 is attracted to axial end plate 23 and is engaged with the frictional surface 2a of rotor 2 by the magnetic flux which is generated by coil 5b of electromagnet 5. Thus, the driving force is transmitted to drive shaft 7 of compressor 1 from rotor 2 through armature plate 10.

Figure 7:
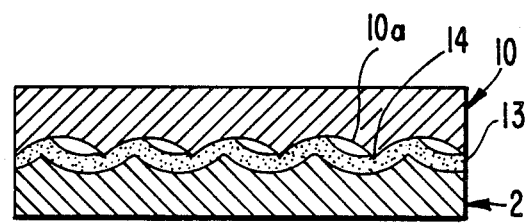
FIG. 7 is an enlarged cross-sectional view illustrating the surfaces shown in FIG. 6 when those surfaces initially contact one another.
Figure 8:
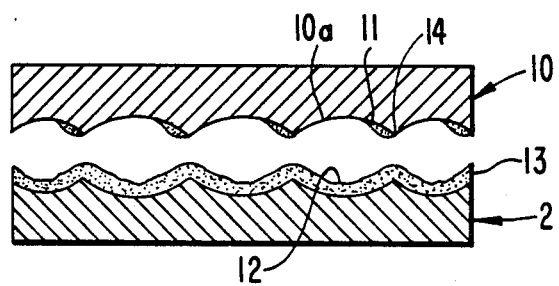
FIG. 8 is an enlarged cross-sectional view illustrating the results of the contact depicted in FIG. 7.

With reference to FIG. 6, when armature plate 10 and rotor 2 initially engage, projections 14 formed on frictional surface 10a of armature plate 10 gnaws into layer 13 as shown in FIG. 7. The projections of layer 13 become partially deformed, with a portion of layer 13 partly shearing off, and adhering to frictional surface 10a of armature plate 10, as shown in FIG. 8. The adherent layer 11 grows due to the engagement of armature plate 10 and rotor 2. As portion 11 gradually increases, the sheared metal is pressed and combined with each other, thus becoming coagulated. When projections 14 gnaw into layer 13, cut out portions 12 are formed. Adherent layer 11 and cut out portions 12 are formed on the same circumferences.

Adherent layer 11 and cut out portions 12 are formed on initial engagement, and sufficient frictional force is produced to prevent a decrease in transmitted torque, even when the attractive force between them is decreased by decreasing the magnetic force. Therefore, after the armature plate 10 is attracted to rotor 1, the electric current supplied to coil 5b of electromagnet 5 may be decreased. The reason for the increase in frictional force between adherent layer 11 and cut out portion 12 is due to the fact that both are made by forcibly tearing layer 13, thus producing a closer engagement between the two portions.

The torque transmitted through the electromagnetic clutch is not affected by the coefficient of friction of the plating metal. Therefore, a plating metal which has a lower hardness and is more inexpensive than the magnetic materials should be utilized, for example, zinc, or a tin and zinc alloy.

Figure 9:
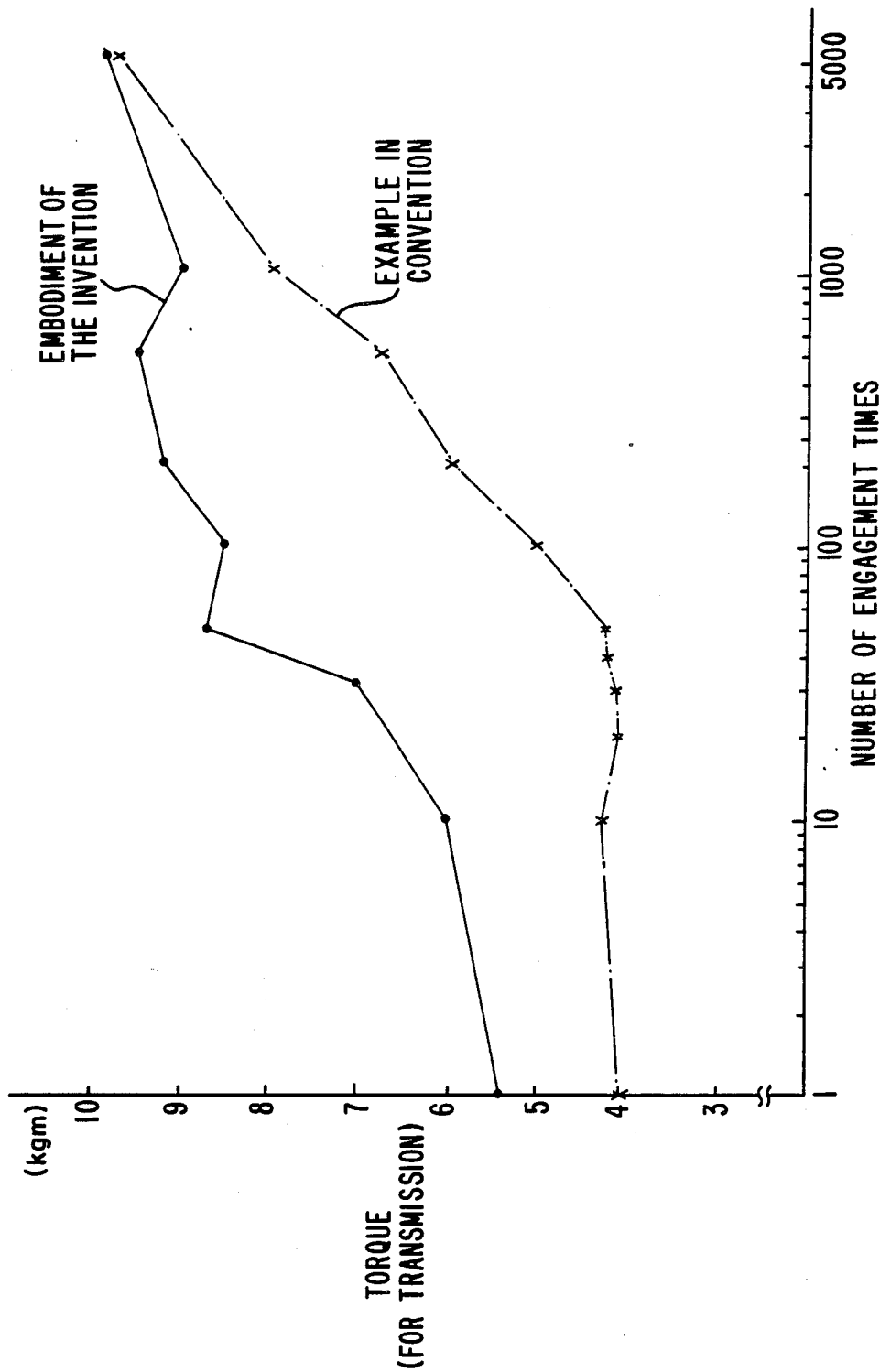
FIG. 9 is a graph which illustrates the amount of torque transferred versed the number of times the clutch is engaged for the present invention and for a clutch known in the prior art.

FIG. 9 depicts the change in transmitted torque within the first 5,000 times of clutch engagement. Since, in the present invention, layer 13 is gradually shaved off by projections 14b of frictional surface 10a and will eventually disappear, the transmitted torque of this invention will eventually equal that of a conventional clutch. The electromagnetic clutch of this invention, however, will produce a higher torque sooner than that produced in the prior art.

The present invention has been described in connection with preferred embodiments. The preferred embodiments are used for illustrative purposes only and it will be understood by those skilled in the art that various modifications may be resorted to, without departing from the spirit of the invention or the scope of the appended claims.

What is claimed is:

1. In an electromagnetic clutch including a first rotatable member of magnetic material rotatably supported on a bearing, an annular electromagnetic device disposed in a stationary position in a hollow portion of said first rotatable member, said annular electromagnetic device including an annular magnetic housing and a annular magnetic coil disposed therein, a second rotatable member, a hub secured on said second rotatable member, a magnetic armature plate supported on and around said hub at a predetermined radial gap, said magnetic armature plate being capable of limited axial movement and facing said first rotatable member at a predetermined axial air gap, said magnetic armature plate further being attracted to said first rotatable member when said annular magnetic coil is energized such that a first frictional surface of said first rotatable member contacts a second frictional surface of said magnetic armature plate, the improvement comprising each of said frictional surfaces having grooves forming a spiral pattern and one of said frictional surfaces having a layer of metal plating with a hardness lower than that of said magnetic material.

2. The electromagnetic clutch of claim 1 wherein said layer of metal comprises zine.

3. The electromagnetic clutch of claim 1 wherein said layer of metal comprises a combination of tin and zinc.

4. The electromagnetic clutch of claim 1 wherein the distance between adjacent grooves is between 0.3 millimeters and 0.5 millimeters.

* * * * *